Sept. 20, 1960 J. W. McDUFFIE 2,953,083
HAY BALERS
Filed July 2, 1956

INVENTOR
JAMES W McDUFFIE

Joseph Allen Brown
ATTORNEY

United States Patent Office 2,953,083
Patented Sept. 20, 1960

2,953,083

HAY BALERS

James W. McDuffie, New Holland, Pa., assignor to Sperry Rand Corporation, New Holland, Pa., a corporation of Delaware Filed July 2, 1956, Ser. No. 595,527

7 Claims. (Cl. 100—142)

The present invention relates generally to automatic hay balers, and more particularly to means in a hay baler for assisting in controlling the travel of picked-up hay into a bale-forming chamber.

The conventional automatic hay baler has a bale casing which extends fore-and-aft, that is, in a direction parallel to the direction of the movement of the baler. Along one side of the bale casing there is a feed opening; and, reciprocable in the bale casing and past this opening is a plunger adapted to compress hay fed into the bale casing into bales. Extending laterally from the feed opening is a feed table or platform onto which hay is deposited, the hay being lifted from a windrow by a pick-up reel or the like. The hay so deposited is conveyed across the feed table, through the feed opening and into the bale casing by suitable feeding means. After each bale is formed, it is automatically banded and tied and then discharged onto the ground behind the baler or onto a trailing wagon.

Heretofore, difficulty has been experienced in movements of the hay adjacent the feed opening. When the plunger moves on a working stroke, it travels rearwardly and past the feed opening. A knife carried on the plunger and cooperative with a ledger knife affixed adjacent the rear, vertical edge of the feed opening, shears off hay to form a wad which is rammed rearwardly and compressed. The successive charges of hay delivered into the bale casing produce the desired bale.

When the plunger is fully extended, one of its sides closes the feed opening in the bale casing. Hay on the feed platform abutting against this plunger side has a tendency to move with the plunger or forwardly relative to the direction of movement of the baler when the plunger is retracted. This, obviously, is undesirable since such hay is moving in a direction opposite to the direction in which it should be moving, namely, laterally (toward the bale casing) and rearwardly. Further, movement of the hay with the plunger tends to produce "tails" on the bales; and, the bales, therefore, are not as square as they otherwise would be.

A primary object of this invention is to provide means, adjacent the feed opening in the bale casing of a baler of the character described, which operates to restrict the hay being fed into the bale casing from moving forwardly with the bale plunger and/or laterally and away from the bale casing, while at the same time permitting free rearward movement of the hay and/or lateral movement toward the bale casing.

Another object of this invention is to provide means of the character described which assumes an inoperative position when hay being fed into the bale casing is moving in a desired direction, and assumes an operative, resisting position when the hay is tending to move in a direction which is not desired.

A further object of this invention is to provide means in a hay baler which contributes to the production of square bales by preventing the formation of "tails" on the bales.

A still further object of this invention is to provide means of the character described which is relatively simply constructed and contains few parts thereby enabling its manufacture and installation at low cost.

Other objects of this invention will be apparent hereinafter from the specification and from the recital in the appended claims.

Figure 1:
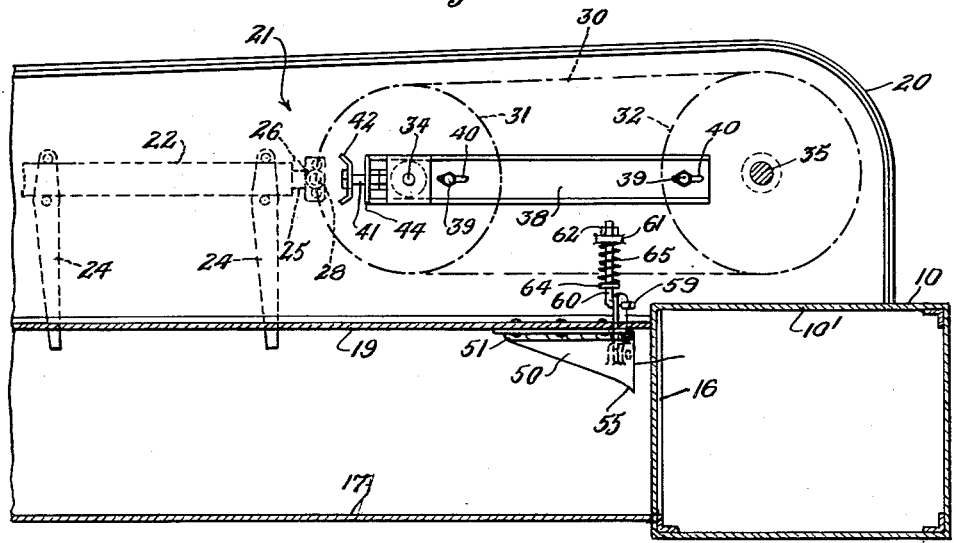
Fig. 1 is a fragmentary, vertical section of the infeed portion of an automatic hay baler having means constructed according to one embodiment of this invention for controlling the movement of hay at the feed opening of the bale casing, said section being taken generally on the lines 1—1 of Fig. 2 and looking in the direction of the arrows.

Referring now to the drawings by numerals of reference, 10 indicates a bale casing which is provided with a feed opening at 11 (Fig. 2) in a vertical side wall thereof. Reciprocable within bale casing 10 and past opening 11 is a plunger 12 driven from a source of power, not shown. Plunger 12 has a vertically extending blade 14 along the rear end of the side 15 of the plunger which moves across opening 11. Knife 14 is cooperative with a ledger knife 16 affixed to bale casing 10 adjacent the rear edge of opening 11 to cut hay fed into the chamber into separate wads.

The baler has a pick-up mechanism (not shown) which lifts the hay from a windrow as the baler traverses a field and deposits the hay onto a wall or platform 17 extending horizontally and laterally from the lower edge of the opening 11 in bale casing 10. The hay delivered onto platform 17 is prevented from escaping rearwardly by a rear wall 18 and it is prevented from piling up higher than the top wall 10' of bale casing 10 by a cover plate or top wall 19. Mounted above platform 17 and bale chamber 10, and extending in the same direction as the platform, is a housing 20 for a mechanism 21 adapted to feed hay across platform 17, through opening 11, into casing 10 and into the path of plunger 12 reciprocable therein. Mechanism 21 operates in timed relation with plunger 12 and may be constructed as shown in co-pending application Serial No. 574,698, filed March 29, 1956, and assigned to the assignee of this invention.

Mechanism 21 comprises, in general, a tubular bar 22 having a plurality of pairs of feed fingers 24 mounted thereon and depending therefrom. Bar 22 is supported at its end remote from bale casing 10 by means, not shown, such as rollers movable over a track. Extending into bar 22 is a rod 25; and interposed between the rod and the bar is spring means, not shown, which resists movement of the rod outwardly relative to the bar.

The outer end of rod 25 is connected, by welding or other suitable means, to a sleeve 26 in which a shaft 28 is rotatable. Shaft 28 is connected to an endless chain 30 rotatable about spaced sprockets 31 and 32, the hubs of which are mounted on shafts 34 and 35, respectively.

Shaft 34 extends through an elongate horizontal slot 36 in the forward wall 20' of the housing 20; and, it is supported on one end of a bracket 38 connected to wall 20' by bolt-nut means 39 which extend through slots 40 in the bracket. Bracket 38 may be adjusted laterally upon loosening bolt-nut means 39 to thereby adjust shaft 34 and sprocket wheel 31 toward or away from shaft 35 and sprocket wheel 32 to effect a proper tightness of endless chain 30. Cooperative with bolt-nut means 39 to hold bar 38 in adjusted position is a bolt 41 carried on a projection 42 welded to wall 20'. Bolt 41 is connectable to a flange 44 on the end of bracket 38.

The rotation of sprockets 31 and 32 is derived from shaft 35 which is driven from a gearbox 45 having an input shaft 46. Shaft 46 is driven by an endless chain 48 trained over a sprocket 49 keyed to the shaft. Chain 48 is driven from any suitable source of power, preferably the power source for plunger 12.

As chain 30 is rotated, tubular bar 22, supporting the feed fingers, is caused to move downwardly relative to feed platform 17 and toward bale chamber 10, then upwardly, and finally rearwardly. During this movement of the bar, the feed fingers 24 move down through slots (not shown) in the top wall 19 and sweep across platform 17. The set of feed fingers on bar 22 closest to bale casing 10, as shown in Fig. 1, enter the bale casing through opening 11 and then are extracted through slots (not shown) in the top wall 10' of the bale casing. The driving of the feed mechanism is so timed with the reciprocations of the plunger 12 that this set of fingers enters chamber 10 when plunger 12 is retracted and are withdrawn through the top of chamber 10 in sufficient time to avoid damage by the plunger on its next compression stroke.

Connected to top wall 19, above feed platform 17 adjacent and forwardly of opening 11 in bale casing 10 is a wedge member or hay dog 50 constructed according to this invention. Wedge member 50 is hinged at 51 to wall 19; and it is shaped like an isosceles triangle having a first edge 52 which extends parallel to and is slightly spaced from bale chamber 10 and a second edge 54 which extends parallel to the direction of travel of feed mechanism 21, that is, transverse to bale casing 10. The hinge connection or third edge 51 is diagonal to bale casing 10 and feed mechanism 21.

As shown best in Fig. 3, the apex of wedge member 50 is bent downwardly to form a nose 55 operable in a manner hereinafter described.

Pivotally connected to the upper face of wedge member 50 at 56 is link arm 58 which extends upwardly through an opening 19' in top wall 19. Connected to link arm 58 is the lower end 59 of an L-shaped rod 60. The upper end of rod 60 is slideable in a bracket 61 welded to and projecting outwardly from front wall 20' of housing 20. A nut 62 is threaded on the upper end of rod 60 to prevent it from dropping down through bracket 61.

Figure 3:
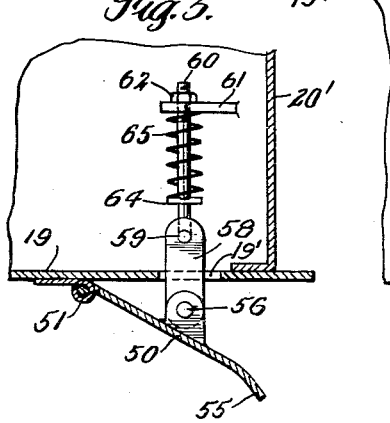
Fig. 3 is a fragmentary section taken on the line 3—3 of Fig. 2 and looking in the direction of the arrows.

Between the end 59 of rod 60 and bracket 61 is a washer 64 which is affixed to the rod; and, interposed between washer 64 and bracket 61 is a coil spring 65 which serves to bias wedge 50 downwardly, as shown in Fig. 3. When a force is directed against the bottom of wedge 50 sufficient to overcome the force of coil spring 65 the wedge will swing upwardly about hinge connection 51 until the member abuts flush against top wall 19 except for the nose 55. Upon removal of the force against the bottom of wedge 50, the member will be returned by spring 65 to the position shown in Fig. 3.

*Operation*

Figure 2:
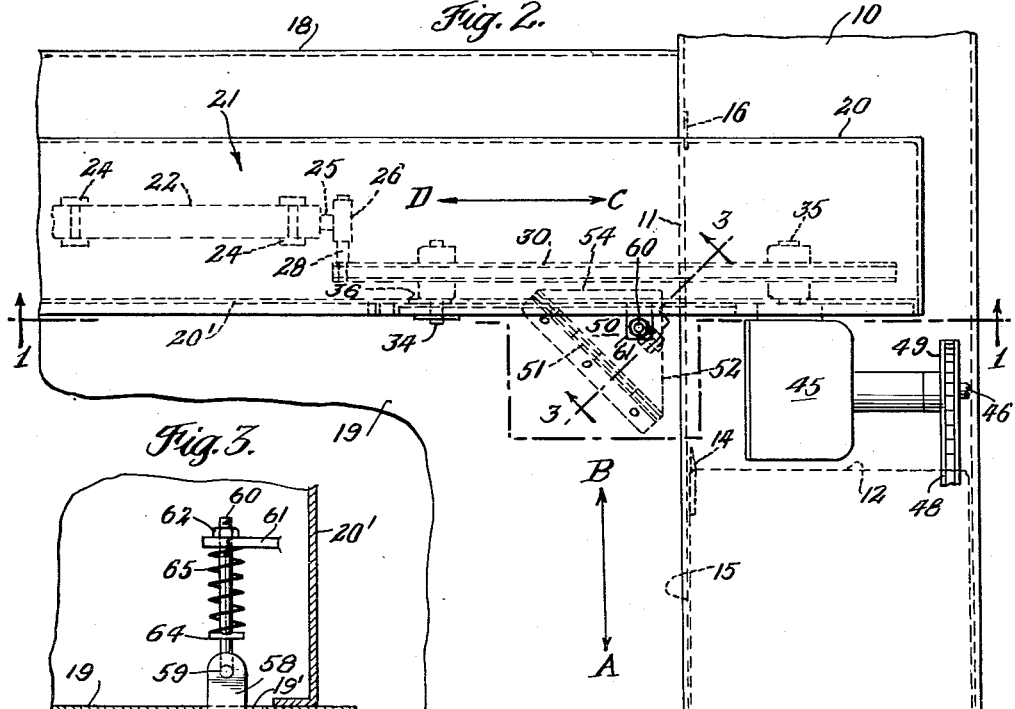
Fig. 2 is a fragmentary plan view of Fig. 1, illustrating further a portion of the drive mechanism for the feeding means of the baler.

Referring to Fig. 2, arrows have been provided to denote directions A, B, C and D, or forward, rear, toward bale casing 10, and away from bale casing 10, respectively.

When the baler is in operation and towed across a field of windrowed hay, hay is elevated by the pick-up means of the baler and conveyed rearwardly and onto feed platform 17. The feed fingers 24 of mechanism 21 reciprocating over platform 17 feed the delivered hay into bale casing 10, conveying it in successive charges through feed opening 11.

Wedge 50, due to its configuration and diagonal mounting, will swing upwardly if engaged from beneath by hay moving in direction B and/or direction C. It, therefore, offers no resistance to hay moving toward opening 11 in bale casing 10.

After a charge of hay has been delivered into the bale casing, plunger 12 moves rearwardly and compresses the charge. At the same time, its knife 14 cooperating with ledger knife 16 shears off the charge from the hay destined to make up the next charge. When plunger 12 is rearwardly extended, its side wall 15 closes feed opening 11. As previously stated, there is a tendency for the hay abutting against this side wall to move rearwardly with the plunger when the plunger is retracted, that is, in direction A. Further, when plunger 12 is retracted and hay is being fed into bale casing 10, there is a tendency for some hay to move out of casing 10 adjacent the forward vertical edge of feed opening 11 or in direction D.

The hay being delivered continuously to feed platform 17 opposes hay tending to move in directions A and D adjacent the lower area between platform 17 and top wall 19. However, hay moving in directions A and D adjacent top wall 19 is not so greatly affected by the incoming hay. It is in this area that wedge member 50 functions primarily. If wedge 50 is in an up position, hay moving against it in directions A and D will engage nose 55 and swing the wedge member downwardly about its diagonal pivot or hinge 51. This will positively stop such hay movement; and, further it will act to strip the hay from the side 15 of the plunger as the plunger moves on a return stroke. Any tendency for a "tail" to form on a bale will be obviated; and, the bales produced in the baler will be squarer than was possible heretofore.

It will thus be seen that wedge member 50 permits free movement of hay travelling in directions B and C, but restricts hay from moving in directions A and D. In addition to the advantages stated above, this adds greatly to the smoothness of operation of the baler and contributes to increased capacity. Further, due to its simple construction and few parts, the wedge device of this invention may be manufactured and installed at low cost.

While the invention has been described in connection with a particular embodiment thereof, it will be understood that it is capable of further modification, and this application is intended to cover any variations, usages, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In a hay baler having a fore-and-aft bale chamber provided with feed opening in a vertical side wall thereof, a plunger reciprocable in said chamber and past said opening, said plunger moving aft on a working stroke and forwardly on a return stroke, a generally horizontal feed platform extending laterally outwardly from adjacent the lower edge of said opening, a roof extending laterally outwardly from adjacent the upper edge of said opening, said platform and roof defining a space for the reception of hay, and feed means for conveying hay delivered to said space through said opening and into said bale chamber, the combination of means outside of said bale chamber, in said space and adjacent the forward edge of said opening for resisting movement of hay forwardly from said space and laterally outwardly from said opening while permitting relatively free movement of hay rearwardly and into said space and laterally toward said opening, said resisting means comprising a wedge member pivotally connected to the under side of said roof and downwardly inclined from the pivot toward said opening, the axis of said pivot being diagonal to the direction of reciprocation of said plunger and to the direction of conveyance of said feed means, said wedge member being swingable upwardly when engaged by hay moving rearwardly and by hay moving toward said opening, and means biasing said wedge member toward a downwardly inclined position to resist movement of hay forwardly and hay moving away from said opening.

2. In a hay baler as recited in claim 1, wherein said resisting means comprises a wedge member which is triangular when viewed in plan, having one edge generally parallel to the direction of reciprocation of said plunger and an adjoining edge generally parallel to the direction of conveyance of said feed means.

3. In a hay baler as recited in claim 2, wherein the wedge member is generally flat except for a downwardly bent nose at the intersection of said two adjoining edges.

4. In a hay baler having a fore-and-aft bale chamber provided with a feed opening in a vertical side wall thereof, a plunger reciprocable in said chamber and past opening, said plunger moving aft on a working stroke and forwardly on a return stroke, a generally horizontal feed platform extending laterally outwardly from adjacent the lower edge of said opening, a roof extending laterally outwardly from adjacent the upper edge of said opening, said platform and roof defining a space for the reception of hay, and reciprocable feeding means including a plurality of feed fingers for conveying hay delivered to said space through said opening and into said bale chamber, the combination of a generally flat, triangularly shaped wedge member having one edge pivotally connected to said roof, the axis of said pivot being diagonal to the direction of reciprocation of said plunger and to the direction of reciprocation of said feeding means, said wedge member having a pair of side edges extending parallel to said direction of reciprocation of said plunger and said direction of reciprocation of said feeding means respectively, said wedge member being inclined downwardly from said pivot toward said opening, means biasing said wedge member towards a downwardly inclined position to resist movement of hay forwardly and away from said opening, said wedge member being swingable upwardly against the resistance of the biasing means when engaged by hay moving rearwardly and by hay moving toward said opening, and a downwardly bent nose on said wedge member at an intersection of said two side edges.

5. In a hay baler having a fore-and-aft bale chamber provided with a feed opening in a vertical side wall thereof, a plunger reciprocable in said chamber and past said opening, said plunger moving aft on a working stroke and forwardly on a return stroke, a generally horizontal feed platform extending laterally outwardly from said opening, a top wall vertically spaced from said platform and also extending laterally outwardly from said opening, said platform and top wall defining a space for the reception of hay, and feed means for conveying hay delivered to said space through said opening and into said bale chamber, the combination of means outside of said bale chamber and in said space for resisting movement of hay forwardly from said space and laterally outwardly from said opening while permitting relatively free movement of hay rearwardly and into said space and laterally toward said opening, said last named means comprising a wedge member disposed adjacent the forward edge of said opening, means mounting said wedge member for movement between two positions responsive to engagement of hay therewith, said wedge member assuming one position when engaged by hay moving forwardly from said space and laterally outwardly from said opening and assuming the other position when engaged by hay moving rearwardly into said space and laterally toward said opening, and means biasing said wedge member toward said one position.

6. In a hay baler having a fore-and-aft bale chamber provided with a feed opening in a vertical side wall thereof, a plunger reciprocable in said chamber and past said opening, said plunger moving aft on a working stroke and forwardly on a return stroke, a pair of vertically spaced walls extending laterally outwardly from said opening and defining a space for the reception of hay, and feed means for conveying hay delivered to said space through said opening and into said bale chamber, the combination of means outside of said bale chamber, and in said space for resisting movement of hay forwardly from said space and laterally outwardly from said opening while permitting relatively free movement of hay rearwardly into said space and laterally toward said opening, said last named means comprising a triangularly shaped wedge member having a first edge extending generally parallel to the fore-and-aft extension of said bale chamber, a second edge extending generally perpendicular to said fore-and-aft extension, and a third edge extending diagonally to the fore-and-aft extension, means connecting said third edge to one of said walls, said wedge member being disposed adjacent said opening and extending angularly relative to said one wall and toward the other wall.

7. In a hay baler, a fore-and-aft bale chamber provided with a feed opening in a vertical side wall thereof, a plunger reciprocable in said chamber and past said opening, said plunger moving aft on a working stroke and forwardly on a return stroke, a feed platform extending laterally from said opening, a top wall vertically spaced from said platform and defining therewith a space for the reception of hay, feed means for conveying hay delivered to said space through said opening and into said bale chamber, said plunger on each return stroke having a tendency to wipe hay, in said space and abutting against plunger, forwardly and along the outside of said vertical side wall of said chamber, and means for resisting such hay wiping while permitting relatively free movement of hay rearwardly adjacent said vertical side wall and into said space, said resisting means comprising a member mounted outside said chamber adjacent said opening and in crop stripping relation to said plunger, said member being of substantially less lateral extent than the lateral extension of said platform and projecting angularly relative to said top wall toward said platform to a point spaced from the platform, and means connecting said member to said top wall.

References Cited in the file of this patent

UNITED STATES PATENTS

| | | |
|---|---|---|
| 362,884 | Ertel | May 10, 1887 |
| 429,240 | Jackson | June 3, 1890 |
| 2,294,440 | Barker | Sept. 1, 1942 |
| 2,381,620 | Russell | Aug. 7, 1945 |
| 2,545,188 | Baskerville | Mar. 13, 1951 |
| 2,674,839 | Russell | Apr. 13, 1954 |
| 2,725,009 | Bornzin | Nov. 29, 1955 |
| 2,757,602 | Nolt | Aug. 7, 1956 |